UNITED STATES PATENT OFFICE.

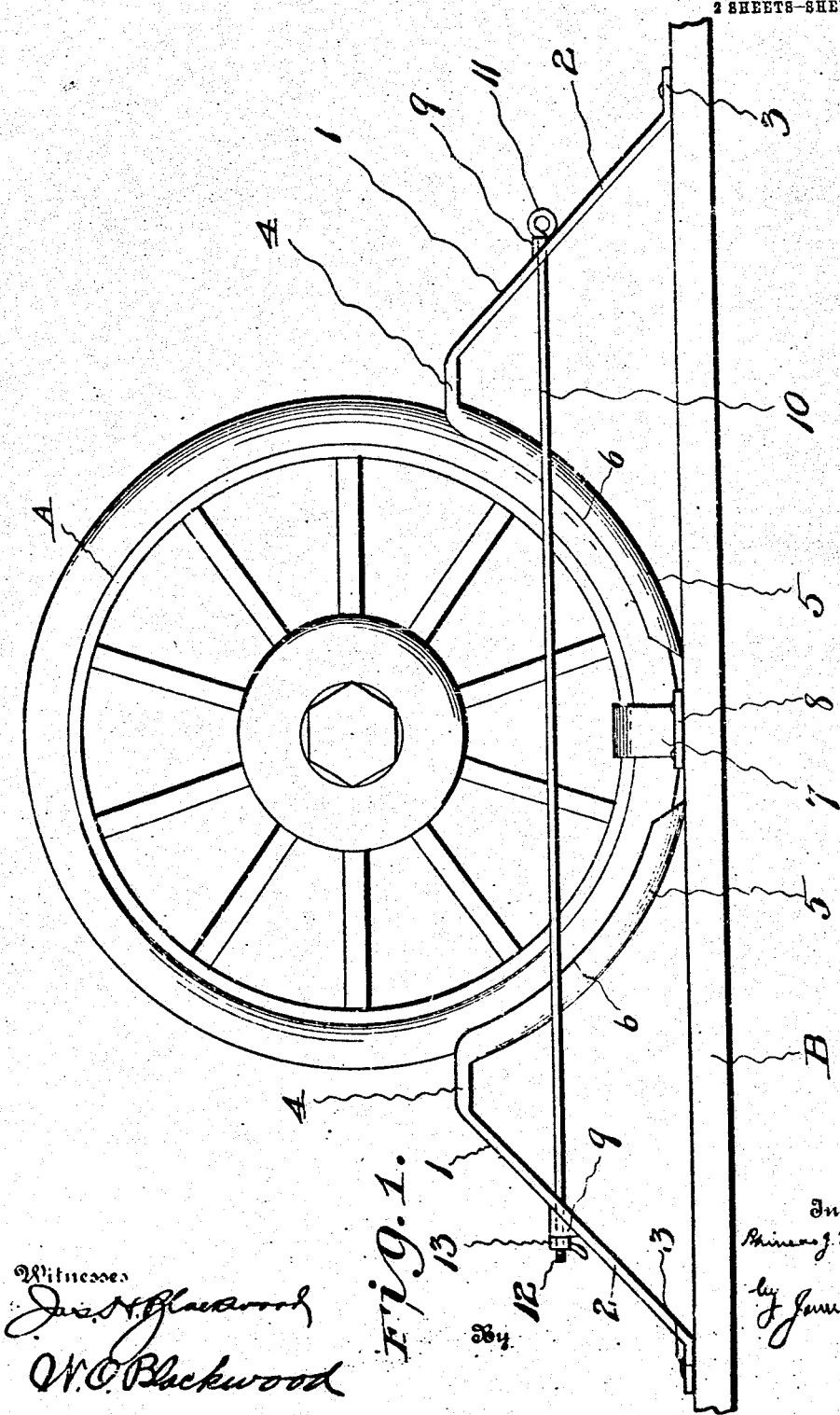

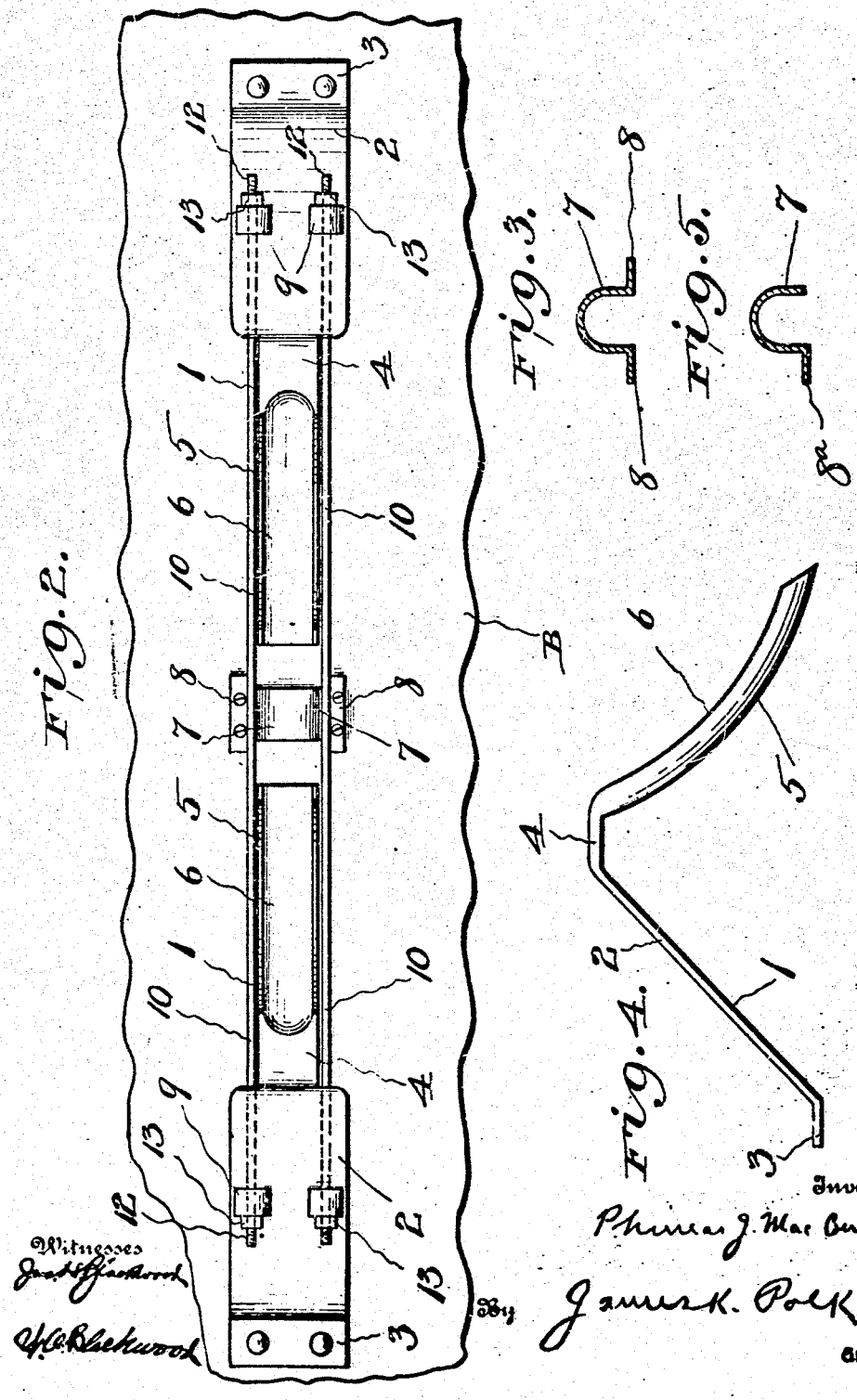

PHINEAS J. MacCONNELL, OF CINCINNATI, OHIO, ASSIGNOR OF ONE-HALF TO JOHN T. CREAHAN, OF CINCINNATI, OHIO.

VEHICLE-WHEEL SUPPORT.

970,841.　　　Specification of Letters Patent.　　Patented Sept. 20, 1910.

Application filed January 5, 1910. Serial No. 536,574.

*To all whom it may concern:*

Be it known that I, PHINEAS J. MACCONNELL, a citizen of the United States, and a resident of Cincinnati, in the county of Hamilton and State of Ohio, have invented certain new and useful Improvements in Vehicle-Wheel Supports, of which the following is a specification.

My invention relates to devices for clamping the wheels of motor vehicles and the like while being shipped, and has for its object the provision of a device that is easily and quickly assembled and dismembered, that is capable of being secured to the floor of a car, freight vessel or the like, so as to hold the vehicle in position and prevent it from moving while in transit, and also that may be used for an indefinite number of times. My invention will be described in detail hereinafter and illustrated in the accompanying drawings, in which—

Figure 1 is a side view of a vehicle-wheel; Fig. 2, a top plan view of one of the clamps; Fig. 3, a cross-section of the wheel-tire engaging portion; Fig. 4, a side view of the wheel-rim clamp; and Fig. 5, a view of a modification of the clamp shown in Fig. 4.

In the drawings similar reference characters indicate corresponding parts throughout all of the views.

A indicates a wheel of a motor-vehicle and B the floor of a car or ship.

My improved supporting device consists of two members designated 1, each having an inclined portion 2, with a foot 3 extending therefrom and secured to the floor B, a horizontal portion 4 and an integral segmental portion 5 that is formed with a concave face 6 to engage the surface of the tire of wheel A.

The rim of the wheel A directly above the floor B is engaged by an inverted U-shaped clamping member 7, having, as shown in Fig. 4, two horizontal feet 8 secured to the floor, and, in Fig. 5, a single foot 8ª secured to the floor.

The inclined portion 2 of each member 1 is wider than the segmental portion 5, and is provided with tubular bosses 9, through which are extended rods 10, one on each side of the wheel, one end of each rod 10 being formed with a head 11 and its other end threaded, as shown at 12, to receive a hand-nut 13 to tighten the members 1 on the wheel, the rods also serving to hold the wheel from side play when in position.

The operation of my improved support will be understood from the explanation in the above description and an inspection of the drawings, so that a detailed description is thought not to be necessary to enable one skilled in the art to use it.

Having thus described my invention, what I claim is—

1. In a vehicle-wheel support, supporting members having inclined portions suitably secured, each member having a concaved segmental portion to engage the wheel-tire, rods engaging said inclined portions to clamp the segmental portions in engagement with the wheel-tire, and an inverted U-shaped member secured between the ends of the segmental portions and engaging the wheel-rim, substantially as shown and described.

2. In a vehicle-wheel support, supporting members having inclined portions suitably secured, each member having a concaved segmental portion to engage the wheel-tire, said inclined portions being wider than the segmental portions and formed with tubular bosses thereon, rods engaging said tubular bosses and having threaded ends to clamp the segmental portions in engagement with the tire, and an inverted U-shaped member secured between the ends of the segmental portions and engaging the wheel-rim, substantially as shown and described.

In witness whereof, I have hereunto set my hand in presence of two subscribing witnesses.

PHINEAS J. MacCONNELL.

Witnesses:
 CHARLES F. MACCONNELL.
 FRANK X. BIMMEDE.